United States Patent [19]
Kiehn

[11] 3,786,681
[45] Jan. 22, 1974

[54] ELECTROMAGNETIC WAVE MODULATION AND MEASUREMENT SYSTEM AND METHOD

[75] Inventor: Robert M. Kiehn, Luling, Tex.

[73] Assignee: SCI Systems, Inc., Huntsville, Ala.

[22] Filed: Mar. 4, 1971

[21] Appl. No.: 121,101

[52] U.S. Cl..................... 73/382, 73/386, 73/398 R, 73/517 R, 331/94.5, 356/33, 356/106 LR
[51] Int. Cl.......................... G01p 15/08, G01v 7/12
[58] Field of Search.. 73/516 R, 517 R, 517 B, 382, 73/386, 398 R; 331/94.5 A, 94.5 M; 356/32, 33–35; 332/7.51; 350/149

[56] References Cited
UNITED STATES PATENTS

| | | | |
|---|---|---|---|
| 3,517,560 | 6/1970 | Jacobs et al. | 73/517 R X |
| 3,506,362 | 4/1970 | Doyle et al. | 331/94.5 A X |
| 3,473,031 | 10/1969 | White | 332/7.51 X |
| 3,463,924 | 8/1969 | Culshaw et al. | 332/7.51 X |
| 3,625,589 | 12/1971 | Snitzer | 350/149 X |

*Primary Examiner*—James J. Gill
*Attorney, Agent, or Firm*—Curtis, Morris & Safford

[57] ABSTRACT

Electromagnetic waves with multiple polarization and/or propagation direction modes, preferably in the form of laser waves, are modulated by means of force-responsive devices such as amorphous quartz elements. The application of force or acceleration to the modulator creates a difference in frequency of two of the modes. That frequency difference is a function of the force or acceleration being measured. The two signals are combined and their difference is detected in a beat detector. In a preferred embodiment, the electromagnetic waves are developed in a ring laser operating with plural circular polarization modes. Preferably, each polarization mode exists in one of the counterdirectional laser beams. The modulator is a quartz cylinder located in the laser cavity. The force is applied in the form of a torque tending to twist the cylinder about its longitudinal axis. The device provides a high degree of sensitivity and a wide range in the measurement of force and acceleration. The invention is described as it is used in gravimeters, pressure altimeters and pressure measurement devices.

11 Claims, 7 Drawing Figures

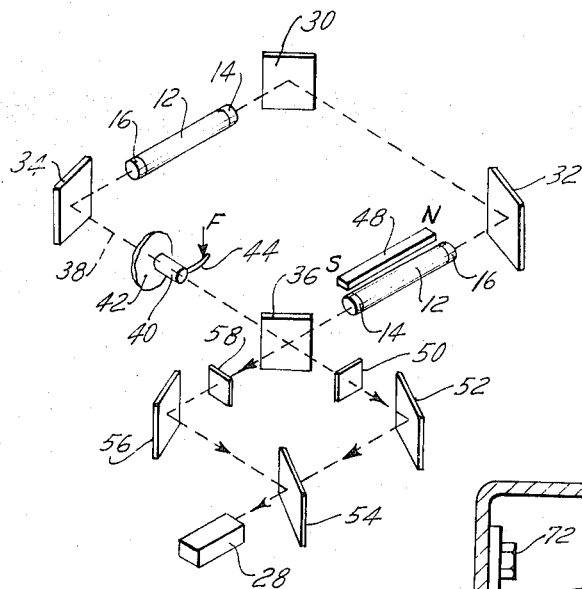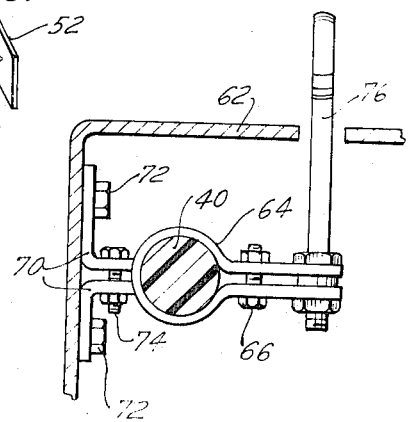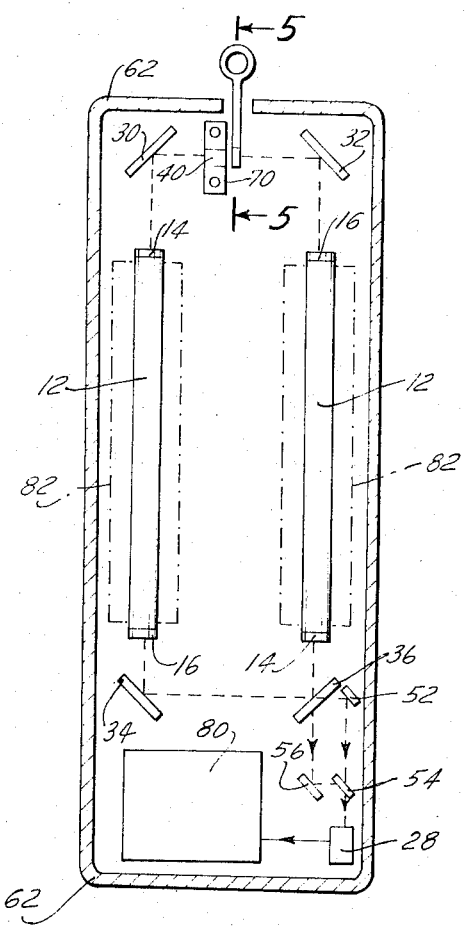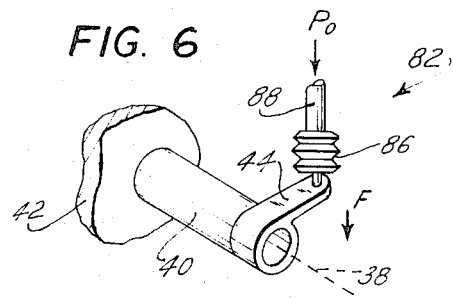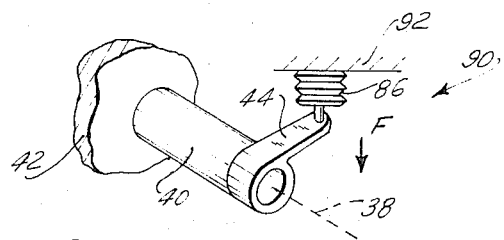

ELECTROMAGNETIC WAVE MODULATION AND MEASUREMENT SYSTEM AND METHOD

This invention relates to the modulation of electromagnetic waves and to force and acceleration measurement devices and methods using such modulation. In particular, this invention relates to such devices in which the electromagnetic waves are laser waves and relates to gravimeters, altimeters, pressure measurement devices and similar instruments utilizing such modulation.

It is an object of the present invention to provide improved means and methods for modulating electromagnetic waves and using such modulation for measurement purposes. It is a more specific object of this invention to provide highly sensitive and accurate means and methods for the measurement of force and acceleration. It also is an object to provide such means and methods which will measure force and acceleration over a relatively wide range of values. It is still another object of the present invention to provide such means and methods which are capable of measuring the force of gravity with a relatively high degree of resolution over a relatively wide range. It is a further object to provide altimeter and pressure measurement devices with the same characteristics.

These objects have been met, in accordance with the present invention, by the provision of an electromagnetic wave modulator which acts differentially upon each of a plurality of polarization and/or propagation direction modes of the electromagnetic waves and those modes are combined so as to develop a beat signal whose frequency is a function of the force applied to the modulator. The frequency units then are converted into units of force, acceleration, pressure, etc. In one embodiment, the modulator is a photo-elastic element whose differential action upon the polarization and/or propagation direction modes is a function of the force applied to the element. The electromagnetic waves preferably are generated by a laser beam generator, and the modulator element is placed in the laser cavity in the path of the beam. In a preferred embodiment of the invention, a ring laser is operated with a plurality of circular polarization modes and two propagation directions. The modulator element is a cylindrical amorphous quartz rod whose longitudinal axis is aligned with the laser beam. Means are provided for applying the force to the rod in the form of a torque.

The foregoing and other objects and advantages will be set forth in or apparent from the following description and drawings. In the drawings:

FIG. 3 is a schematic perspective view of another embodiment of the invention;

FIG. 4 is a cross-sectional view of another embodiment of the invention;

FIG. 5 is a cross-sectional view taken along line 5—5 of FIG. 4; and

Each of FIGS. 6 and 7 is a schematic view of another embodiment of the invention.

Figure 1:
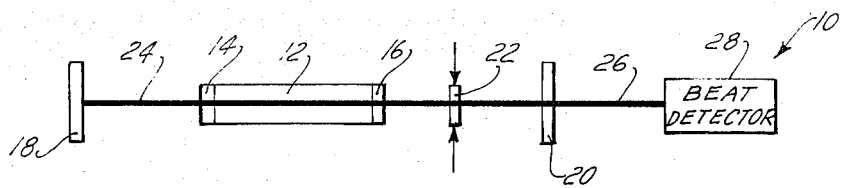
FIG. 1 is a schematic diagram of one embodiment of the present invention.

FIG. 1 shows a force and acceleration measurement device 10 of the present invention in one of its simplest forms. The device 10 includes a gas laser tube 12 with a pair of nonreflective, nonpolarizing windows 14 and 16 at its ends. A laser cavity is formed by a pair of mirrors 18 and 20 which reflect the laser beam 24 created by the tube 12 in the conventional manner. The mirror 18 is substantially fully reflective, whereas the mirror is partially transmissive so as to allow the passage therethrough of an output laser bean 26. The beam 26 is detected by a conventional photoelectric detector 28.

In accordance with the present invention, a modulator element 22 is positioned in the laser cavity so as to intercept the laser beam 24. A force to be measured is applied transversely to the modulator element 22. Preferably, in this embodiment of the invention, the modulator element 22 is an amorphous quartz disc to which the force F is applied at opposite points on the edge of the disc.

Conventional cold cathode discharge electronic means (not shown) are provided for pumping the laser and thereby initiating the laser action of the tube 12.

The laser cavity is tuned and the tube 12 is operated such that at least two modes of polarization of the laser beams exist simultaneously. In this embodiment of the invention, it is preferred that the polarization modes be linear modes. For example, the two modes might be the horizontal and vertical polarization modes of the beam.

The element 22 normally is isotropic and has substantially no effect on the laser beam. However, when a force is applied, the element 22 becomes birefringent and acts differentially upon the two polarization modes of the laser beam. That is, it changes the frequency of one of the modes relative to the frequency of the other. These modes are combined in the detector 28 to form a beat signal, and the detector thus is a "beat detector."

Applicant has discovered that the frequency of this beat signal is substantially directly proportional to the force applied to the modulator element 22. Therefore, by measuring the frequency of the signal detected by the beat detector 28, and converting that frequency in accordance with appropriate calibration values, the magnitude of the force can be determined.

Figure 2:
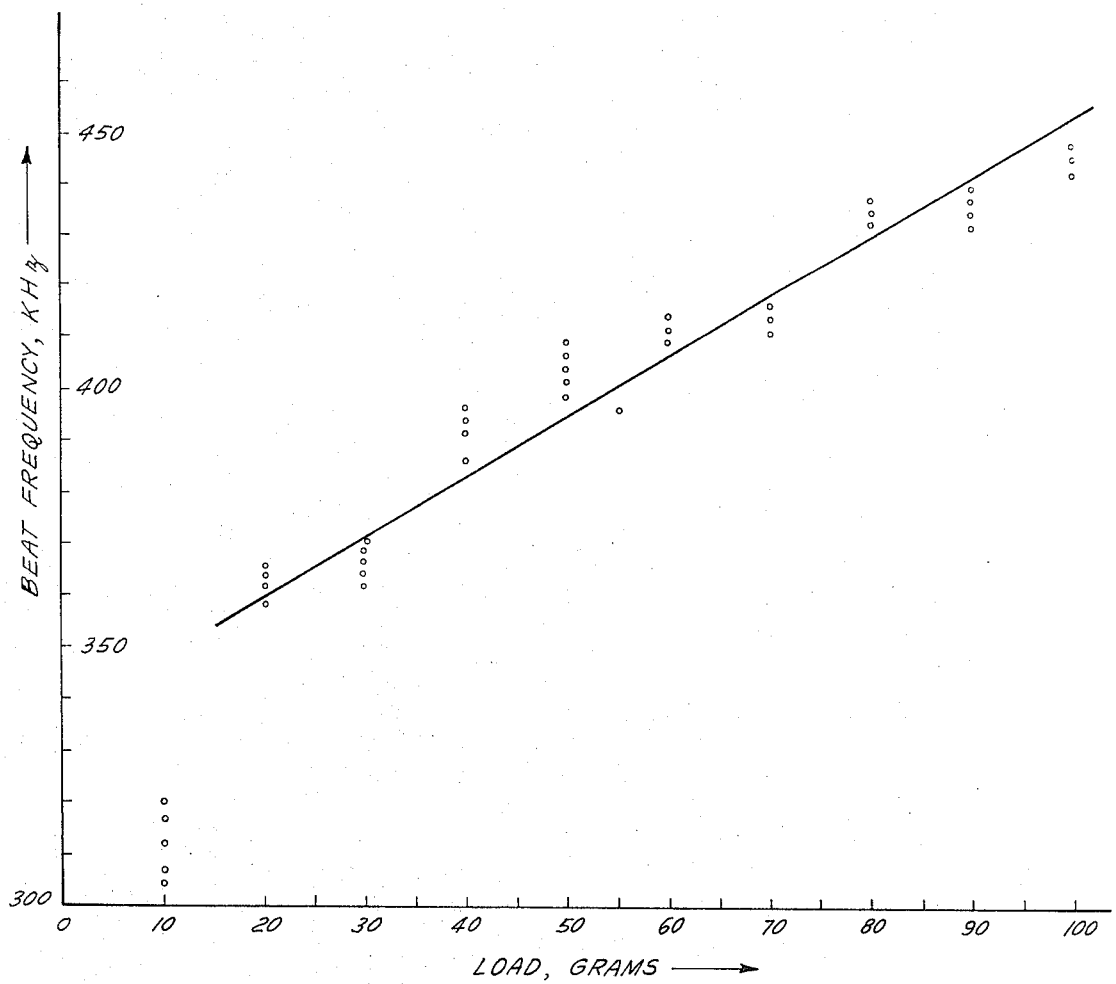
FIG. 2 is a graph illustrating the performance of the device shown in FIG. 1.

FIG. 2 is a graph illustrating the performance of a device which was actually built as shown in FIG. 1 and successfully tested. It can be seen that the load in grams, when plotted against the beat frequency forms a substantially straight line, except at lower loads where there is a discontinuity in the curve which is believed to be caused by phase locking of the signals. However, this discontinuity usually can be avoided merely by applying a bias force to the disc 22 or by prestressing the disc, and can be practically eliminated by careful design of the coatings on the mirror and window surfaces.

The device which actually was used to provide the curve shown in FIG. 2 had a helium-neon laser tube 12, Model No. 120 manufactured by Spectra Physics, Inc. The usual Brewster windows at the ends were replaced by nonpolarizing windows 14 and 16 coated with an anti-reflective coating adapted to have peak transmission at a wavelength of 11523 A. The cavity was tuned to the wavelength 1.15 micron, which is in the infrared region of the electromagnetic spectrum. The beat detector 28 was a "Tropel" Model 330 light detector manufactured by Tropel, Inc., Fairport, N. Y., and a "Monsanto" Model 101A counter-timer to give a digital read-out. The counter-timer was manufactured by Monsanto Electronic Special Products, Cupertino, California. The modulator disc 22 was an unstressed amorphous quartz (fused silicon) disc 3/10 inch thick and one inch in diameter. The force F was applied at opposite points on the edge of the disc so that the force was applied asymmetrically. It is believed that asymmetric application of the force gives better results than would symmetrical application.

It is believed to be possible to detect a change in beat frequency of as little as one cycle per second, with the device 10 shown in FIG. 1. As it can be seen from FIG. 2, this would correspond to a very small change in force. Thus, the potential resolution of the device 10 is very high. Thermal noise and the Doppler broadened loss-gain profile limit the range of operation of the device. However, it is believed that the range encompasses about 10 decades in frequency, thereby yielding a device of extremely wide dynamic range.

Somewhat related developments are shown in the prior art. One such development is described in the article entitled "Properties of an Anisotropic Fabry-Perot Resonator" by Walter M. Doyle and Matthew B. White in "Journal of the Optical Society of America," Vol. 55, No. 10, pages 1221 - 1225, October, 1965. Another development is shown in "Laser Technology and Applications," page 221, Samuel L. Marshall, Editor, McGraw Hill, 1968. Neither of these publications, however, describes a force measurement system utilizing force-responsive differential effects on different polarization modes of a laser beam.

FIG. 3 illustrates the preferred form of the invention. Two of the laser tubes 12 are used in a ring laser configuration. The laser beams of the tubes 12 are reflected by mirrors 30, 32, 34 and 36. Mirror 36 is partially transmissive to allow a portion of the laser beam to be delivered to the beat detector device 28.

The modulator element in this embodiment is a cylindrical rod 40 of quartz. It is secured at one end to a stationary mounting structure 42, and has a lever arm 44 secured to its other end. A force F is applied to the lever arm 44 so as to convert the force into a torque on the cylinder 40. A magnet 48 is provided adjacent one of the tubes 12 so as to create a magnetic field longitudinally through the tube which ensures that the laser beams produced by the tubes 12 each operate predominantly in a circular polarization mode. Otherwise, operation is as described above for FIG. 1.

In the arrangement shown in FIG. 3, the laser tubes 12 develop four waves, two pairs of waves traveling in opposite paths around the ring, one pair moving clockwise, and the other counter-clockwise. Each beam is predominantly circularly polarized. One of the counter-rotating beams is extracted from the cavity and travels through a first polarizer to a reflector 56 and then to a polarizing beam-splitter 54. The other counter-rotating beam is extracted from the cavity and travels through another polarizer 50 to a mirror 52 and then to the beam-splitter 54. The beam-splitter 54 combines the two signals and develops a beat signal in the beat detector 28, whose frequency is a function of the force F applied to the lever arm 44, and, hence, the torque applied to the rod 40.

It is believed that the torque applied to the rod 40 creates a Faraday rotation effect which acts upon the counter-rotating beams oppositely to create a frequency difference. Regardless of the mode in which it operates, the rod does create the desired effect.

The polarizers 50 and 58 preferably are Brewster angle polarizers. They are provided merely to improve signal mixing in the detector 28, in a known manner. The beam-splitter 54 is conventional.

A frequency-changing effect also can be detected in two linear polarization modes of either one of the counter-rotating beams. This can be done simply by blocking the transmission of either beam to the beam-splitter. The polarizer 50 or 58 then acts upon the other beam to create separation of the polarization modes in accordance with the force applied to the rod 40. It is believed that this effect is not as pronounced as the one produced by beating together the counter-rotating beams.

There are four signal modes in the ring of FIG. 3; two polarization mode signals for each of the counter-rotating beams.

It is believed that the stability of the system can be improved by separating each of the four signal modes out of the ring and then re-combining them in a manner such that any noise signals caused by mechanical or thermal instabilities will be opposed to one another and thus cancelled. For example, the two polarization modes of each counter-rotating beam can be separated out of the system, re-combined to create a beat signal, and then the two resulting beat signals can be beat together to produce the desired stabilization.

It should be understood that many variations can be made in the embodiments of the invention described above without departing from the essence of the invention.

It is believed that a gas laser is not necessary to successful operation of the invention, and that any known continuous wave laser source can be used instead. In fact, it is believed that the invention will work with pulsed as well as continuous wave lasers, although the latter are preferred.

The particular transition 1.15 micron at which the laser tubes of all of the above-described embodiments have been operated is not believed to be the only transition at which operation will be successful. Other suitable transitions can be selected in accordance with the laser source used and the particular requirements of the optical system in which it is used.

Although two laser tubes 12 are used in the ring laser system shown in FIG. 3, the only reason for this is that the particular type of tube actually used in the system which was tested did not have enough gain to be used alone. In a practical system, it is believed that a single tube with sufficient gain can be used alone.

The use of the magnet 48 to assure predominantly circular polarization of the output of the laser tubes 12 is not essential. Circular polarization can be assured by other techniques, well known in the art.

It should be understood, of course, that, although the ring laser form shown in FIG. 3 is preferred, the modulator 40 also is believed to be operative in a two-mirror cavity such as is shown in FIG. 1.

Substances other than amorphous quartz or fused silica are known to exhibit a force-responsive birefringent effect. Plastics such as Lucite and related substances are good examples. However, amorphous quartz is believed to have the best combination of force sensitivity, and temperature and structural stability for most practical uses of the invention.

GRAVIMETER

FIGS. 4 and 5 show a device 60 utilizing the ring laser system of FIG. 3 to measure the force of gravity. The ring laser is mounted in an elongated housing 62 which preferably has a width sufficiently small to allow the gravimeter to be lowered into an oil well bore-hole to record the changes in the force of gravity at various points along the bore-hole. With the relatively high resolution and range which the device is expected to have, it is believed that the gravimeter 60 will give information hitherto not available in the oil well exploration field.

The ring laser is the same in the gravimeter as it is shown in FIG. 3, except that it is aligned vertically to better fit into the elongated housing 62. Also, the quartz rod 40 is mounted on the wall of the housing 62 by means of a bracket 70 and fasteners 72. Another fastner 74 is used to clamp the bracket tightly into the rod. An eye-bolt 76 with a nut 68 is fastened to another bracket 64 which is clamped onto the other end of the rod 40 by a fastner 66. The portion of the bracket 64 which extends between the rod 40 and the lower end of the eyebolt 76 forms a lever arm corresponding to the lever arm 44 shown in FIG. 3.

The gravimeter 60 is suspended by attaching a support means such as a cable or the like to the eyebolt 76. The gravimeter 60 has a certain mass which gravity acts upon to apply a force downwardly on the bracket 70 and to thus apply to the rod a torque proportional to the gravitational force on the gravimeter. The force of gravity will be indicated by the beat frequency detector 28.

A power supply for the laser tubes, and signal conversion and telemetering equipment to transmit the signals to the surface of the earth are shown schematically at 80. The starters for the tubes 12 are shown in dashed outline at 82.

PRESSURE MEASUREMENT DEVICE

FIG. 6 shows schematically a modification of the ring laser system of FIG. 3 which makes the device capable of measuring gas pressures. A set of bellows 86 receives the gas through a conduit 88 and converts the gas pressure $P_o$ into a force F which is applied to the end of the lever arm 44 and thereby applies to the rod 40 a torque which is proportional to the gas pressure. Thus, the beat detector reading, with suitable calibration, will indicate the gas pressure.

PRESSURE ALTIMETER

FIG. 7 shows another modification of the ring laser of FIG. 3 to provide a pressure-operated altimeter. The bellows 86 abutts against a stationary surface 92 at one end, and against the end of the lever arm 44 at its other end. The bellows are sealed. When the ambient air pressure around the bellows decreases with increasing altitude, the gas in the bellows tends to expand and apply a force F to the lever arm 44 to develop a beat signal which is a function of the altitude.

ACCELEROMETER

The gravimeter shown in FIGS. 4 and 5 actually is a specialized form of accelerometer. Any acceleration having a componenet in the direction of the longitudinal axis of the device 60 will, through its action on the mass of the device, develop a force which creates a beat signal whose frequency is a function of the acceleration.

It should be understood that various changes other than those specifically mentioned above can be made without departing from the spirit or scope of the invention.

I claim:

1. A force-responsive measurement device comprising, in combination, laser beam generator means for generating a beam of electromagnetic waves having a plurality of circular polarization modes, modulator means comprising a photo-elastic element for differentially alternating the characteristics of said polarization modes in response to the application of a stress, means for applying a torque proportional to said force to said element and stressing said element about the axis of the laser beam to produce a frequency difference between said modes, and means for detecting said frequency difference.

2. A device as in claim 1 in which said laser beam generator includes a laser tube and at least three reflectors forming a ring laser cavity for said tube.

3. A device as in claim 1 in which said laser beam generator is a gas laser tube.

4. An accelerometer comprising, in combination, a force-responsive measurement device as in claim 1, a body having mass, means for supporting said body and said photo-elastic element, and means for converting the acceleration force of said mass into said force.

5. A gravimeter comprising an accelerometer as in claim 4 arranged so that the force of gravity acts on said body to develop said force.

6. A gravimeter as in claim 5 in which said body comprises components of the gravimeter itself.

7. A pressure altimeter comprising a force-responsive device as in claim 1 with means for varying the torque applied to said element as a function of the degree of vacuum existing at the altitude in question.

8. A pressure measurement device comprising a force-responsive measurement device as in claim 1 with means for varying the torque applied to said element as a function of the pressure to be measured.

9. A device as in claim 1 including reflector means forming a ring cavity for said waves, said waves being counter-rotating laser waves developed in said ring cavity, said photo-elastic element being located in the path of said waves in said ring cavity, means for extracting the counter-rotating beams from the cavity and beating them together to develop a beat frequency signal and means for transmitting said beat frequency signal to said detecting means.

10. A force measurement method comprising generating electromagnetic waves in the form of a laser beam with a plurality of circular polarization modes, using forceresponsive photo-elastic means and rotational stress-producing means to differentially modulate said polarization modes in accordance with said force to produce a frequency difference which is a function of said force, and converting the frequency units into corresponding units of force.

11. A method of measuring force-actuated phenomena, said method comprising creating counter-rotating beams in a ring laser system, applying a force to means for converting said force into a torque and applying said torque to create rotational stress in a photo-elastic modulator in the paths of said beams for creating differential effects on said counter-rotating beams, extracting and combining said beams to form a beat signal, and measuring the frequency of said beat signal.

* * * * *